United States Patent [19]

Hakim

[11] Patent Number: 4,701,487

[45] Date of Patent: Oct. 20, 1987

[54] EXTRUSION PROCESSING AID COMPOSITION AND POLYOLEFIN CONTAINING SAME

[75] Inventor: John Hakim, Tulsa, Okla.

[73] Assignee: Petrolite Corporation, St. Louis, Mo.

[21] Appl. No.: 501,473

[22] Filed: Jun. 6, 1983

[51] Int. Cl.[4] .................. C08K 5/20; C08L 23/00; C08L 23/12; C08L 23/20

[52] U.S. Cl. ................................ 524/229; 264/211; 106/316; 524/232

[58] Field of Search ............... 524/279, 487, 488, 275, 524/490, 210, 228, 229, 230, 233, 227, 232; 264/211

[56] References Cited

U.S. PATENT DOCUMENTS

| | | | |
|---|---|---|---|
| 3,976,612 | 8/1976 | Kaji et al. | 524/488 |
| 4,032,493 | 6/1977 | Pascual | 524/488 |
| 4,070,316 | 1/1978 | Combs et al. | 524/487 |
| 4,127,619 | 11/1978 | Godfrey | 524/487 |
| 4,130,618 | 12/1978 | Hill | 524/487 |
| 4,180,490 | 12/1979 | Maclean | 524/487 |

*Primary Examiner*—Allan M. Lieberman
*Attorney, Agent, or Firm*—Robert E. Wexler

[57] ABSTRACT

There is disclosed an extrusion processing aid composition for the extrusion of polyolefins, particularly linear low density polyethylene and high density polyethylene films or sheets; polyolefin compositions containing said processing aid and a process of extruding polyolefins using said processing aid. The processing aid is a composition comprising (a) an amide of a saturated or unsaturated carboxylic acid or a saturated or unsaturated alkylene bis-amide of a saturated or unsaturated dicarboxylic acid; (b) an aliphatic hydrocarbon polymer mixture having a molecular weight of from about 400 to about 50,000; and (c) an oxygen-containing high density, low molecular weight ethylene polymer.

30 Claims, No Drawings

EXTRUSION PROCESSING AID COMPOSITION AND POLYOLEFIN CONTAINING SAME

BACKGROUND OF THE INVENTION

The present invention generally relates to the extrusion polyolefins, particularly low density polyethylene, linear low density polyethylene and high molecular weight, high density polyethylene resins in the form of film, especially blown or cast film or sheet.

Linear low density polyethylene (LLDPE) resins were introduced in the U.S. market recently and have had a substantial impact on industry. The mechanical properties of LLDPE provide superior performance, in terms of strength and puncture resistance, which results in thinner films useful in a variety of applications and have resulted in the opening of new markets.

LLDPE, due to its unique molecular structure and resulting rheology, has created special problems in processing. These problems include the net reduction of throughput due to the high horsepower required to process a kilogram of polymer and the requirement for more torque than is available for most blown film drives to maintain equivalent throughput. Since more torque is needed to extrude LLDPE, extruders are pushed to the limits of their capabilities and the resulting melt temperature is higher than desired for extruding blown film. The higher melt viscosity and higher temperatures are detrimental to the machinery and to the end product.

To maintain throughput, modification of equipment, modification of the resin and the use of higher temperatures, or a combination thereof, are required. Higher torque, higher temperatures and higher pressures have detrimental effects the properties of the final products, including the phenomenon of sharkskin melt fracture, i.e., surface roughness of the film. Sharkskin is largely a result of high melt temperature from frictional heat generated by higher extrusion torques.

The extrusion of LLDPE requires substantially higher power for processing than low density polyethylene (LDPE). In addition, high and ultra high molecular weight, high density polyethylene (HDPE) require additional power to extrude and their torque requirements can be double that of LDPE. Most extruder drives do not have the capability of generating such high torque and, therefore, extrusion throughput is sacrificed to accommodate the higher torque requirement.

The reduction in screw speed which is necessary to compensate for mechanical overloading of the extruder and its critical components, such as gear box and thrust bearings, creates yet another major problem for the film processor. The rotational speed of the screw in the extruder is a function of drive power; reduction in screw speed as a result of lower torque results in lower throughput.

Throughput studies indicate that a conventional LDPE extruder which would normally handle a 2.0 melt index (MI) LDPE, suffers a 27% loss in throughput when a 1.0 MI LLDPE is processed.

The loss of throughput has created a market for the manufacturers of machinery and equipment capable of extruding LLDPE without throughput loss. Many screw designs have been suggested and evaluated. In fact, the so-called "short screws" are being used in applications where LDPE blown film extruders have been retrofitted for blown LLDPE film production. These modifications of existing machinery or purchases of new generation extruders involve large sums of capital. In the majority of cases, such an investment is impractical.

Present manufacturers are also trying to change the processing requirements of LLDPE resins by modification of resin technology.

Another approach is to blend LLDPE with LDPE resins. Such blending to increase production and ease processing requirements has partially solved some of the problems associated with the extrusion of LLDPE resins. Depending upon the ratio of LDPE to LLDPE in the blend, the properties of the blended resin film are substantially different from that of unmodified LLDPE film as evidenced by inferior draw-down capabilities and other physical properties.

LLDPE film exhibits superior tensile strength, tear strength, draw-down characteristics, stiffness and puncture resistance. These properties, however, will dramatically deteriorate as the level of LDPE in the blend increases. The two most important properties of LLDPE, film tear resistance and puncture resistance, will decrease considerably with the increase of LDPE in the blend.

Accordingly, it is an object of the present invention to provide a processing aid composition which is blended with polyolefins, especially with LLDPE or LDPE, or blends thereof, or HDPE resins or blends thereof to afford increased extrusion throughput by altering the rheology of the resins, thereby resulting in higher screw speeds, lower head pressures, reduced power consumption, lower torque and lower processing temperatures while maintaining throughput.

Additionally, it is an object of the present invention to provide a composition comprising a polyolefin or polyolefin blends, particularly LLDPE or LDPE resins, or blends thereof, or HDPE and blends thereof and a processing aid composition therefore.

Further, it is an object of the present invention to provide a process for extruding polyolefins such as LLDPE, LDPE or HDPE and blends thereof which comprises adding to said polyolefin, prior to extrusion, a processing aid composition as described herein.

SUMMARY OF THE INVENTION

In accordance with the present invention, there is provided a processing aid composition which is blended with polyolefin resins, such as polyethylene, polypropylene, polybutylene and blends thereof and the like, in order to increase extrusion throughput while allowing moderate processing conditions and lower equipment stress.

The processing aid composition of the present invention is comprised as follows:

(a) an amide of a saturated or unsaturated carboxylic acid or an alkylene bisamide of a saturated or unsaturated dicarboxyllic acid; (b) an aliphatic hydrocarbon polymer or mixture thereof having a number average molecular weight of from about 400 to about 50,000; and (c) an oxygen-containing HDPE having an average molecular weight of from about 1,000 to about 3,000.

DETAILED DESCRIPTION OF THE INVENTION

As described above, the processing aid of the present invention comprises (a) an amide of a saturated or unsaturated carboxylic acid, especially a monocarboxylic acid, or an alkylene bis-amide of a saturated or unsaturated dicarboxylic acid, (b) an aliphatic hydrocarbon polymer or mixture thereof having a number average molecular weight from about 400 to 50,000 and (c) an oxygen-containing low molecular weight HDPE.

The amides which have been found useful in accordance with the present invention include primary amides of carboxylic acids having from about 12 to about 22 carbon atoms. Thus, for example, there may be used amides of lauric, myristic, palmitic and stearic acids as well as diamides of acids such as oxalic and adipic acids and amides of unsaturated acids such as oleic and erucic acids.

The alkylene bis-amides which have been found useful in accordance with the present invention generally have the structure.

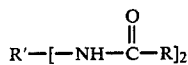

wherein R' represents alkyl having from about 2 to about 5 carbon atoms and R represents an alkylene group of from about 12 to about 22 carbon atoms. Illustrative alkylene bis-amides include, but are not limited to, ethylene bis-stearamide, ethylene bis-palmamide, propylene bis-stearamide, propylene bis-oleamide and the like.

The processing aid composition additionally comprises aliphatic hydrocarbons and mixtures thereof having an average molecular weight (vapor pressure osmometer) of from about 400 to about 50,000, preferably from about 600 to about 35,000, especially from about 600 to about 25,000. Examples of such hydrocarbon materials include, but are not limited to, petroleum waxes, including high melting point paraffin waxes, microcrystalline waxes, tank bottoms and the like, synthetic waxes such as α-olefin, Fischer-Tropsch and amide waxes, low molecular weight polyethylene and reactive waxes, e.g., ester waxes, and the like.

A third component of the processing aid composition of the invention comprises an oxygen-containing, high-density polyethylene having an average molecular weight (vapor pressure osmometer) of from about 1,000 to about 3,000, preferably from about 1,200 to about 1,700, with an acid number of from about 10 to about 30, preferably from about 15 to about 25. This component may be prepared by free radical oxidation of polyethylene, by copolymerization of ethylene with an oxygen-containing monomer such as vinyl acetate or by graft polymerization of polyethylene with an oxygen-containing monomer, e.g., acrylic acid or maleic anhydride, or polymer.

The above described processing aid composition is blended with a polyolefin, e.g., LLDPE, LDPE or HDPE resins or blends thereof in solid form (e.g., prills, pellets) at a level of from about 0.005 to about 8% by weight, preferably from about 0.05 to about 6% by weight, especially from about 1 to about 4% by weight.

Although the processing aid of the present invention may be used in a wide variety of particle sizes, ranging from micronized powder to pellets, for ease of blending and for maximum efficiency the particle size of the processing aid and the particle size of the polyolefin with which it is blended should be matched as closely as possible. The most efficient blending results from a blend of powdered processing aid and powdered polyolefin resin. The processing aid may also be added to the polyolefin in an extruder in liquid, i.e., molten, form.

The processing aid may be added to the polyolefin in a master blending operation and the master batch then fed to the extruder or the processing aid may be added to the polyolefin by conveyor feeding or auger feeding at an appropriate zone of the extruder.

The polyolefin resins to which the processing aid is added, e.g., polyethylenes, polypropylenes, polybutylenes and the like and blends thereof, may contain customary formulating additives such as fillers, e.g., carbon black, titanium dioxide, calcium carbonate, talc, mica, clays and other additives such as colorants, pigments, plasticizers, impact modifiers and the like.

The processing aid composition, depending on the nature of the polyolefin resin, comprises from about 0 to about 6% amide, from about 86 to about 100% aliphatic hydrocarbon mixture and from about 0 to about 8% oxidized, low molecular weight HDPE.

The following examples illustrate specific embodiments of the invention, including the best means for practicing the invention, but it is understood that the examples are illustrative only and the invention is not to be limited thereby.

EXAMPLE 1

This example illustrates the preparation of a typical processing aid composition of the present invention.

In a mild steel reactor, equipped with heater and a mixing blade, there were blended 2500 gms. of a composition comprising 3% by weight ethylene bis-stearamide, 94% by weight of a mixture of aliphatic hydrocarbon polymers having a number average molecular weight of about 850 and 3% by weight of low molecular weight, oxidized HDPE. The materials were blended under mild agitation for 15 minutes at 150° C.

Typical properties of the processing aid composition of the invention are:

| PROPERTY | TEST METHOD | UNITS |
| --- | --- | --- |
| Softening Point | ASTM D-36 | 112.8° C. |
| Viscosity @ 121° C. | ASTM D-3236 | 21 cps |
| Color | ASTM D-1500 | 0.5 |
| Flash Point | ASTM D-92 | 296° C. |
| Density | ASTM D-1505 | 0.93 gm/cc |
| Acid Number | BWM 3.01 AT | ·1.5 mg KOH/gm |
| FDA Status | Indirect Food Additive | Passes |

It is to be understood that other acid amides, as described above, should function in a manner equivalent to ethylene bis-stearamide. Thus, it is contemplated that, for example, lauramide, stearamide, oxalamide, adipamide, oleamide and erucamide may be used in lieu of ethylene bis-stearamide in the above and following examples.

EXAMPLE 2

This example illustrates the preparation of a typical processing aid composition of the present invention. In a simple blender equipped with mixing blades, there was blended 2500 grams of a composition comprising 0.9% by weight ethylene bis-stearamide, 98.2% by weight of a mixture of aliphatic hydrocarbon polymers having a number average molecule weight of about 21,000 and 0.9% by weight of low molecular weight, oxidized HDPE. The materials was blended for 15 minutes at room temperature and was extruded in a 19 mm extruder at 105° C. into a single strand (4 mm diameter) and subsequently pelletized into pellet form.

Typical properties of the processing aid composition of the invention in Example 2 are:

| PROPERTY | TEST METHOD | UNITS |
|---|---|---|
| Softening Point | ASTM D-36 | 230° F. (110° C.) |
| Viscosity @ 175° C. | ASTM D-3236 | 33000 CPS |
| Density | ASTM D-1505 | 0.926 g/cc |
| Flash Point | ASTM D-92 | 495° F. (257° C.) |

EXAMPLE 3

This example illustrates extrusion data obtained when the processing aid composition of Example 1 was blended with HDPE. The data were developed using a ¾ inch (19 mm.) Brabender extruder (25:1 L/D) with a 3:1 ratio with a ⅛ inch (3 mm.) rod die.

Temperature Profile:
Zone I 185° C.
Zone II 185° C.
Zone III 185° C.
Die 193° C.

TABLE I

| MATERIAL | TORQUE (m. gm.) | SCREWSPEED RPM | THROUGHPUT gms/min | % Increase | TORQUE CHANGE |
|---|---|---|---|---|---|
| 100% Gulf 9634 HDPE | 1850 | 25 | 13.0 | — | — |
| 1% Additive in Gulf 9634 | 1750 | 25 | 13.1 | — | (5.4) |
| 1% Additive in Gulf 9634 | 1800 | 28 | 14.5 | 11.5 | — |
| 2% Additive in Gulf 9634 | 1600 | 25 | 13.1 | — | (13.5) |
| 2% Additive in Gulf 9634 | 1850 | 31 | 16.6 | 27.7 | — |

As indicated in the above data, the processing aid used at a level of 1% to 2% reduces the torque requirement by 5.4% to 13.5% when compared with virgin resins at the same screwspeed. However, when screwspeed was increased to 28 RPM and finally to 31 RPM to reach the torque of virgin resin (1850 m. gm.) throughput was increased from 11.5% (at 1% level) to 27.7% (at 2% level).

EXAMPLE 4

This example illustrates extrusion data obtained upon blending the processing aid composition of Example 1 with LLDPE.

TABLE II

| LLDPE Extrusion Data Dowlex 2045 LLDPE | | |
|---|---|---|
| | 43 RPM 100% Resin | 43 RPM 98% Resin + 2% Additive | 63 RPM |
| Throughput, Kg/hr | 33 | 31 | 39 |
| Head Pressure, Kg/cm² | 274 | 253 | 295 |
| Screwspeed, RPM | 43 | 43 | 63 |
| Amperage | 43 | 37 | 43 |
| Volts | 160 | 160 | 230 |
| Melt Temperature °C. | 246 | 246 | 252 |
| Throughput Change | — | (5.5%) | 18.1% |

As shown by the above data, at 2% level, the processing aid increased throughput by 18.1% at the same amperage.

EXAMPLE 5

This example further illustrates extrusion data when the processing aid composition of Example 1 was blended with LLDPE.

TABLE III

| Exxon LPX 2.09 LLDPE | | |
|---|---|---|
| | 43 RPM 100% Resin | 43 RPM 98% Resin + 2% Additive | 53 RPM |
| Throughput, Kg/hr | 31 | 29 | 35 |
| Head Pressure, Kg/cm² | 222 | 211 | 225 |
| Screwspeed, RPM | 43 | 43 | 53 |
| Amperage | 36 | 32 | 36 |
| Volts | 160 | 160 | 195 |
| Melt Temperature °C. | 232 | 232 | 232 |
| Throughput Change | — | (5.9%) | 12.9% |

Extruder: 64 mm. single stage
24:1 L/D with 203 mm. die
Temperature profile:
Barrel (all 4 zones) 204°–221° C.
Die 204°–221° C.
Screen Pack 30-60-30

EXAMPLE 6

This example further illustrates extrusion data of a blend of the processing aid composition of Example 1 with LLDPE.

TABLE IV

| Exxon LPX 1.09 LLDPE | | |
|---|---|---|
| | 41 RPM 80% LLDPE/20% | 41 RPM LDPE + 2% Additive | 58 RPM |
| Throughput, Kg/hr | 62 | 59 | 75 |
| Head Pressure, Kg/cm² | 422 | 369 | 408 |
| Screwspeed, RPM | 41 | 41 | 58 |
| Amperage | 148 | 115 | 142 |
| Throughput Change | — | (4.5%) | 21.0% |

Extruder: 102 mm. dual head
24:1 L/D with 203 mm. die
Temperature profile:
Barrel (all zones) 225°–235° C.
Die 230°–237° C.

In Tables II–IV, note that the amperage (2nd column) has been reduced substantially, thereby reducing the load on the extruder while only a minor reduction in throughput is effected. In the 3rd column, amperage has been raised to the level of the amperage of the 1st column, thereby increasing throughput at the same load level.

EXAMPLE 7

This example illustrates extrusion results comparing the reduction in torque achieved using the processing aid of Example 1 compared with use of a mixture of hydrocarbons having an average molecular weight of about 850. The data were developed using a 19 mm. Brabender extruder (L/D-25:1) with a 3:1 ratio and a 3 mm. rod die.

Temperature Profile:
Zone 1 185° C.
Zone 2 190° C.

Zone 3 190° C.
Die 190° C.
Melt Temp. 211° C.

TABLE V

| MATERIAL | SCREW SPEED (RPM) | TORQUE (m. gm.) | % REDUCTION in TORQUE |
|---|---|---|---|
| LLDPE | 25 | 1800 | — |
| LLDPE + 2% Hydrocarbon | 25 | 1650 | 8.3 |
| LLDPE | 25 | 1750 | — |
| LLDPE + 2% Processing Aid | 25 | 1600 | 9.9 |

As the data illustrate, the processing aid composition was more effective than the mixture of hydrocarbons.

EXAMPLE 8

This example illustrates extrusion results of LLDPE using a Fischer-Tropsch hydrocarbon (known as Sasol Paraflint H-1).

The data were developed using a 19 mm Brabender extruder (25:1 L/D) with a 3:1 comparison ratio and a 3 mm rod die temperature profile:
Zone 1 185° C.
Zone 2 190° C.
Zone 3 190° C.
Die 190° C.
Melt temperature 212° C.

TABLE VI

| MATERIAL | SCREW SPEED (RPM) | TORQUE (M. Gm) | % REDUCTION IN TORQUE |
|---|---|---|---|
| LLDPE* | 25 | 1650 | — |
| LLDPE + 2% Fischer-Tropsch | 25 | 1450 | 12 |

*LLDPE used in this experiment is a mixture of 50 parts LLDPE and 50 parts LDPE.

EXAMPLE 9

This example further illustrates extrusion data of a blend of the processing aid composition of EXAMPLE 2 with LLDPE resin.

| Extruder: | 4.5 inch Egan 30:1 (L/D) | Die: 24 inch Gap: 35/1000 | |
|---|---|---|---|
| | Extrusion Data | | |
| | | Dowlex 2045 | |
| | 72 RPM 100% Resin | 72 RPM 98% Resin + 2% Processing Aid | 82 RPM |
| Throughput, Kg/h | 220 | 218 | 250 |
| Head Pressure, Kg/Cm² | 302 | 288 | 309 |
| Screw Speed, RPM | 72 | 72 | 82 |
| Amperage | 197 | 182 | 197 |
| Melt Temperature °C. | 224 | 224 | 235 |
| Throughput change | — | (0.8%) | 13.6% |

As shown by the above data, at 2% level the processing aid increased the throughput by 13.6% at the same amperage.

It is contemplated that other polyolefins, such as polypropylene, polybutylene and blends thereof with each other and with polyethylene, would show similar results in the above examples.

While the illustrative embodiments of the invention have been described here and above with particularity, it will be understood that various other modifications will be apparent to and can be readily made by those skilled in the art without departing from the spirit and scope of the invention. Accordingly, it is not intended that the scope of the claims appended hereto be limited to the examples and description set forth herein but rather that the claims be construed as encompassing all of the features of patentable novelty which reside herein, including all features which would be treated as equivalents thereof by those skilled in the art to which the invention pertains.

The embodiments of this invention in which an exclusive property or privilege is claimed are defined as follows:

1. An extrusion processing aid for polyolefins comprising an acid amide or an alkylene bis-amide of a saturated or unsaturated mono- or dicarboxylic acid, an aliphatic hydrocarbon or mixture of aliphatic hydrocarbons having a number average molecular weight of from about 400 to about 50,000 and an oxygen-containing, high density ethylene polymer having an average vapor pressure osmometer molecular weight of from about 1,000 to about 3,000.

2. Processing aid of claim 1 wherein said acid amide is stearamide.

3. Processing aid of claim 1 wherein said alkylene bis-amide is ethylene bis-stearamide.

4. Processing aid of claim 1 wherein said aliphatic hydrocarbon is a petroleum wax.

5. Processing aid of claim 1 wherein said aliphatic hydrocarbon is a synthetic wax.

6. Processing aid of claim 5 wherein said synthetic wax is a Fischer-Tropsch wax.

7. Processing aid of claim 1 wherein said aliphatic hydrocarbon is a polyethylene.

8. Processing aid of claim 1 wherein said aliphatic hydrocarbon has an average molecular weight of from about 600 to about 35,000.

9. Processing aid of claim 1 wherein said aliphatic hydrocarbon has an average molecular weight of from about 600 to about 25,000.

10. Processing aid of claim 1 wherein said oxygen-containing polymer is oxidized, high density polyethylene having an acid number of from about 10 to about 30.

11. Processing aid of claim 10 wherein said polyethylene has an average molecular weight of from about 1200 to about 1700 and an acid number of from about 15 to about 25.

12. Composition comprising a polyolefin and from about 0.005 to about 8% by weight of the processing aid of claim 1.

13. Composition comprising a polyolefin and from about 0.005 to about 8% by weight of the processing aid of claim 2.

14. Composition comprising a polyolefin and from about 0.005 to about 8% by weight of the processing aid of claim 7.

15. Composition comprising a polyolefin and from about 0.005 to about 8% by weight of the processing aid of claim 10.

16. Composition comprising high density polyethylene and from about 0.005 to about 8% by weight of the processing aid of claim 1.

17. Composition comprising high density polyethylene and from about 0.005 to about 8% by weight of the processing aid of claim 2.

18. Composition comprising high density polyethylene and from about 0.005 to about 8% by weight of the processing aid of claim 7.

19. Composition comprising high density polyethylene and from about 0.005 to about 8% by weight of the processing aid of claim 10.

20. Composition comprising low density polyethylene and from about 0.005 to about 8% by weight of the processing aid of claim 1.

21. Composition comprising low density polyethylene and from about 0.005 to about 8% by weight of the processing aid of claim 2.

22. Composition comprising low density polyethylene and from about 0.005 to about 8% by weight of the processing aid of claim 7.

23. Composition comprising low density polyethylene and from about 0.005 to about 8% by weight of the processing aid of claim 10.

24. Composition comprising linear low density polyethylene and from about 0.005 to about 8% by weight of the processing aid of claim 1.

25. Composition comprising linear low density polyethylene and from about 0.005 to about 8% by weight of the processing aid of claim 2.

26. Composition comprising linear low density polyethylene and from about 0.005 to about 8% by weight of the processing aid of claim 7.

27. Composition comprising linear low density polyethylene and from about 0.005 to about 8% by weight of the processing aid of claim 10.

28. Composition comprising a blend of high density polyethylene, low density polyethylene, linear low density polyethylene and from about 0.005 to about 8% by weight of the processing aid of claim 1.

29. Composition of claim 12 wherein said polyolefin is polypropylene.

30. Composition of claim 12 wherein said polyolefin is polybutylene.

* * * * *